United States Patent

Pedersen et al.

[11] Patent Number: 5,377,454
[45] Date of Patent: Jan. 3, 1995

[54] METHOD OF TRUING AND ANGLING CUTTER BLADES BY SHARPENING

[75] Inventors: Harry Pedersen, Penfield; Richard L. Kitchen, East Rochester, both of N.Y.

[73] Assignee: The Gleason Works, Rochester, N.Y.

[21] Appl. No.: 877,910

[22] Filed: May 1, 1992

[51] Int. Cl.6 .............................................. B24B 49/00
[52] U.S. Cl. ........................................ 451/5; 451/12; 451/21
[58] Field of Search .......... 51/165 R, 165.71, 165.75, 51/165.74, 165.77, 165.87, 287, 5 D, 94 CS, 287; 125/2, 3, 11.01, 11.03, 11.04

[56] References Cited

U.S. PATENT DOCUMENTS

| | | | |
|---|---|---|---|
| 2,930,112 | 3/1960 | Thomas | 407/22 |
| 3,192,604 | 7/1965 | Whitmore | 407/22 |
| 3,268,980 | 8/1966 | Blakesley et al. | 166/129 |
| 3,817,002 | 6/1974 | Carlson | 51/287 |
| 4,170,091 | 10/1979 | Ellwanger | 51/5 D |
| 4,202,222 | 5/1980 | Ainoora | 51/94 CS |
| 4,341,044 | 7/1982 | Cross | 51/5 D |
| 4,760,668 | 8/1988 | Schlaefli | 51/165.87 |
| 4,991,353 | 2/1991 | Wiener | 51/5 D |
| 4,993,096 | 2/1991 | D'Amato | 51/165.87 |
| 5,020,279 | 6/1991 | Abyson | 51/5 D |
| 5,076,020 | 12/1991 | Negri | 51/5 D |
| 5,138,799 | 8/1992 | Buckingham | 51/165 R |

FOREIGN PATENT DOCUMENTS 9120021 12/1991 WIPO .

Primary Examiner—Maurina T. Rachuba
Attorney, Agent, or Firm—Robert L. McDowell; Ralph E. Harper

[57] ABSTRACT

Disclosed herein is a method of truing and angling the blades of a form-relieved face mill cutter during the blade sharpening process thus eliminating a separate time-consuming procedure for truing and angling. The position of the cutting edge of each blade is determined and a reference blade is selected. The sharpening plane of each remaining cutting blade is repositioned, if needed, such that after removing stock material from the blades in accordance with the newly repositioned sharpening plane, the cutting edge of each blade will follow essentially the same path when the cutter is rotated about its axis.

46 Claims, 9 Drawing Sheets

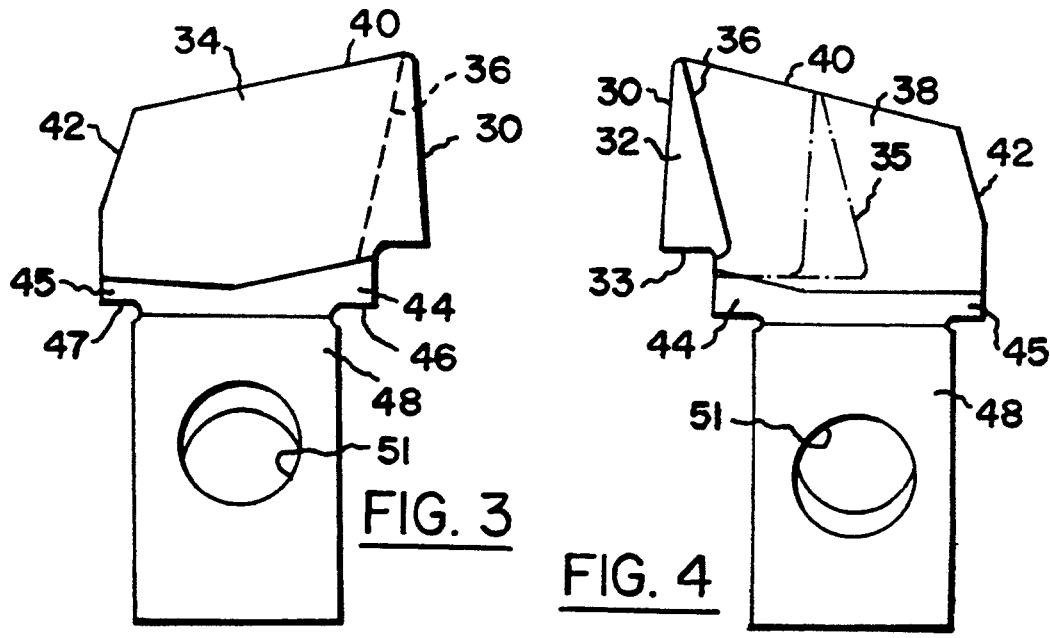
FIG. 3
FIG. 4
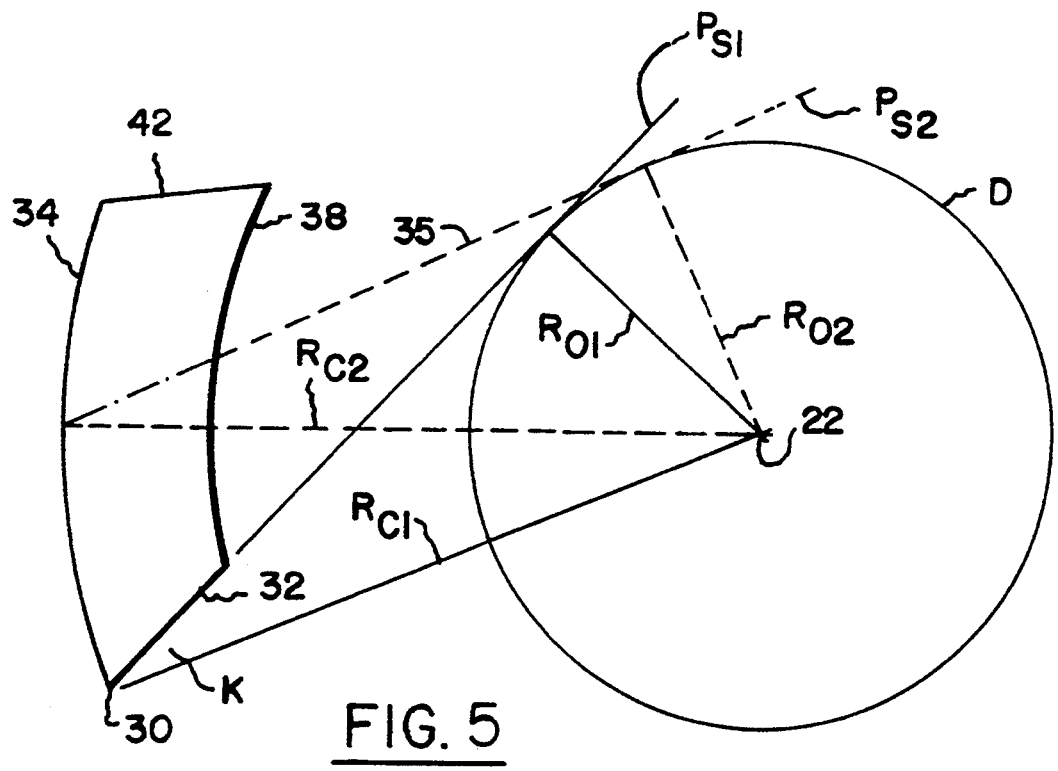
FIG. 5

METHOD OF TRUING AND ANGLING CUTTER BLADES BY SHARPENING

FIELD OF THE INVENTION

The present invention relates generally to sharpening the blades on cutters such as those cutters utilized in the production of gears and the like. More particularly, the present invention relates to a method of truing and angling the blades on a cutter by sharpening.

BACKGROUND OF THE INVENTION

Form-relieved face mill cutters have been used for many years in processes for producing gears, particularly spiral bevel and hypoid gears and the like.

Face mill cutters of the form-relieved type comprise a plurality of cutting blades extending in an axial direction from one side of a cutter head with the cutting blades usually arranged and spaced equidistantly about the cutter head. The cutter head itself is adapted to be secured to the rotary cutter spindle carried by a machine tool. Each cutting blade includes a front face and a cutting edge formed by the intersection of the front face with the top, radius, and one side surface of the cutting blade. Wedges and/or shims are commonly utilized in order to correctly orient each cutting blade with respect to the axis of rotation of the cutter head. An example of a form-relieved face mill cutter utilizing shims and wedges is disclosed by U.S. Pat. No. 2,390,112 to Thomas.

The cutting blades which are usually releasably secured to the cutter head may be blades known as outside blades which cut the concave side of the teeth of a work gear, or, the blades may be those known as inside blades which cut the convex side of the work gear teeth. Examples of face mill cutters having outside blades and face mill cutters having inside blades are shown in U.S. Pat. No. 3,192,604 to Whitmore. Alternatively, cutting blades and cutter heads may be of unitary construction, formed from a solid body of material such as high speed steel.

Another type of face mill cutter is shown by U.S. Pat. No. 3,268,980 to Blakesley et al. wherein cutters for roughing and cutters for finishing are shown in which both outside and inside cutting blades are alternatively arranged about a cutter head. This type of cutter forms the entire tooth slot between adjacent teeth on a work gear since each pair of inside and outside blades forms the opposite sides of adjacent teeth.

As with any cutter, continued use of form-relieved face mill cutters causes the cutting blades to become dull and therefore they must be periodically sharpened. It therefore becomes necessary to sharpen each blade by removing an amount of stock material from the front face of each blade thus removing the worn cutting edge and forming a new sharpened edge at the intersection of the newly formed front face and the top, radius, and one side surface of the blade. The side and end faces on the cutting blades used in form-relieved face mill cutters are helicoids. When the front face surface is removed for sharpening purposes, the new front face profile has the same shape and radial position relative to the cutter axis as the prior profile; but, it is displaced axially toward the back of the cutter. When dealing with a set of blades mounted in a cutter head, they must all be equally spaced and the sharpening planes must all have equal spacing. If, for some reason, an extra amount of material were to be removed from the front face of a single blade, the cutting edge would appear to move radially relative to the cutting edges of the other blades. For example, the cutting edge on an outside blade would move inwardly and the cutting edge on an inside blade would move outwardly.

Not only do cutting blades become worn during the cutting process, they are also subjected to intense cutting forces which can cause the blades to be moved from their precise mounted positions on the cutter head. In cutting, it is very important that the cutting edges of the blades track one another within a very narrow range. In generating processes, this range should be about 0.001–0.002 inches (0.0254–0.0508 mm) for rough cutting gear tooth spaces and about 0.0001–0.0003 inches (0.00254–0.00762 mm) for finish cutting. It has commonly been the procedure to reposition each blade after sharpening in order to restore the blade to its proper position. This procedure is known as truing and angling.

Truing is the process wherein each blade is aligned such that the cutting edges thereof are located at the same radial position relative to the axis of the cutter within a narrow tolerance. In the generating process, any blade-to-blade variation will cause the tooth surface to have a flatty appearance.

Angling is the procedure whereby the cutting edge of each blade is positioned at the same angular direction. When optimum tooth surface conditions are required, it has been customary that both angling and truing be controlled by the use of various wedges to adjust the radial and angular positions of each blade. Such cutters are expensive to manufacture, involve a great deal of skill and the amount of time required to make necessary blade adjustments can be quite lengthy, on the order of 2-6 hours for example.

It is an object of the present invention to essentially eliminate the great lengths of time heretofore needed to accomplish truing and angling of blades of a form-relieved face mill cutter.

It is another object of the present invention to incorporate truing and angling of blades as a part of the sharpening process for form-relieved face mill cutters.

SUMMARY OF THE INVENTION

The present invention is directed to a method of radially truing and angling the cutting blades of a form-relieved face mill cutter. The method comprises removing a predetermined amount of stock material from the cutting face of at least one of the cutting blades whereby radial positioning and angular positioning of the cutting edge of the blade or blades, with respect to the remaining cutting blades, is controlled such that the cutting edge of each of the cutting blades follows essentially the same path when the cutter is rotated about its axis of rotation. The method of the present invention thereby eliminates the separate mechanical adjusting of the cutting blades as a means to control radial and angular positions thereof.

In the preferred embodiment, the present inventive method of sharpening the blades of a form-relieved face mill cutter, wherein the sharpening includes radial truing and angling of the blades, comprises providing a form-relieved face mill cutter having an axis of rotation and a plurality of blades with the plurality of blades comprising at least one group of like blades, such as a group of inside blades and/or a group of outside blades. Each of the plurality of blades comprising a front face having a tip, a base and two edges with one of the two edges being a cutting edge extending from the top of the front face to the base of the front face.

The inventive process may include removing a predetermined amount of stock material from the front face of each of the plurality of blades in order to produce an essentially defect-free face and cutting edge. The cutting edge of each like blade (e.g. each inside blade or each outside blade) is then probed at a first point near the tip of the front face and the location of said first point of said each blade is stored.

The first point locations of all blades of the one group are then compared and the one blade having the lowest first point location from all the like blades is selected. A first point difference between the lowest first point location of the one blade and the location of the first point of each remaining like blade is calculated and stored for each of the remaining like blades.

A new first point location for each of the remaining like blades is established by subtracting the first point difference for each remaining like blade from the respective location of the first point for each remaining like blade whereby for each remaining like blade, the location of each new first point is substantially the same as said lowest first point location of the one lowest blade.

The cutting edge of each like blade is then probed at a second point near the base of the front face and the location of the second point of each like blade is stored.

The location of the second point of the aforementioned one lowest blade is compared with the location of the second point of each of the remaining like blades, and a second point difference between the second point location of one lowest blade and the location of the second point for each remaining like blade is calculated.

A new second point location for each remaining like blade is then established by subtracting the second point difference of each remaining blade from the respective second point location of each remaining like blade.

A new cutting edge for each remaining like blade is calculated based upon the new first point and the new second point for said each remaining like blade.

Stock material is then removed from each remaining like blade thereby forming a new cutting edge thereon whereby the new first and second points for each remaining like blade lie on the new cutting edge.

BRIEF DESCRIPTION OF THE DRAWINGS

FIGS. 3 and 4 are opposite side schematic views of an individual outside cutting blade.

FIG. 5 is a diagram illustrating the relationship of a cutting blade to the axis of a cutter.

DETAILED DESCRIPTION OF THE PREFERRED EMBODIMENT

The preferred embodiment of the present invention will now be discussed with reference to the accompanying Figures some of which have been enlarged or exaggerated for the purpose of clarity.

Figure 1:
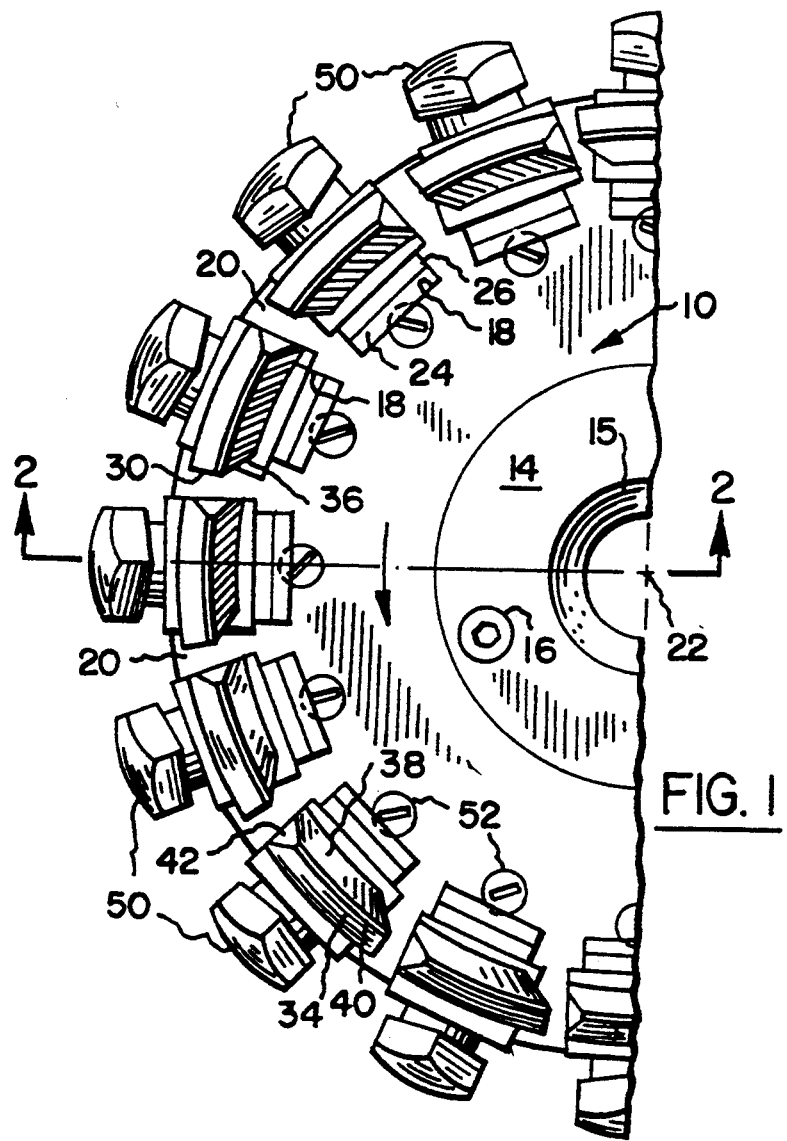
FIG. 1 is a top view of a sectioned form-relieved face mill cutter.
Figure 2:
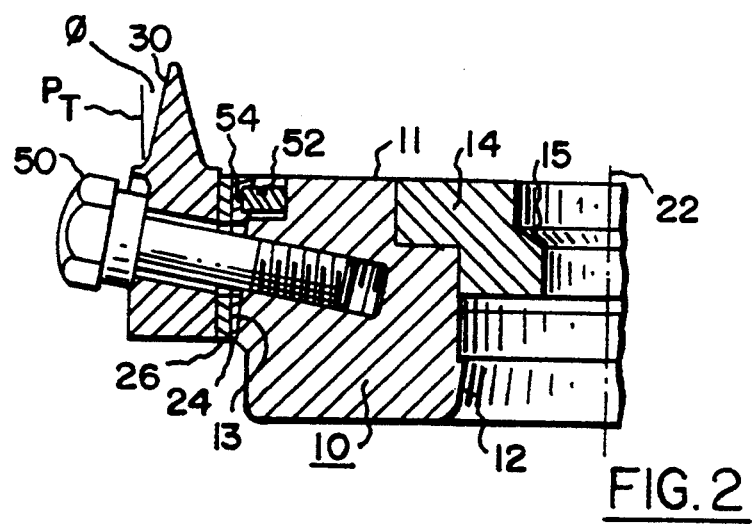
FIG. 2 is a cross-sectional view taken along line 2—2 of FIG. 1.

FIGS. 1 and 2 illustrate a conventional form-relieved face mill cutter. The cutter comprises a cutter head 10 having a front face 11 and a tapered bore 12. A plate 14 is secured to cutter head 10 by a plurality of screws one of which is shown at 16. The plate 14 has a seat 15 for a screw (not shown) which secures the cutter to the spindle of a machine tool for rotation about axis 22. The cutter head 10 has a plurality of blade receiving slots 18 located about the periphery thereof. The slots are separated by lands 20.

A cutting blade is inserted into each of the slots 18. In FIG. 1 the cutting blades comprise outside cutting blades which cut the concave side of the teeth on a work gear. It is to be understood that the cutter may comprise inside cutting blades which cut the convex side of work gear teeth or the cutter may include both inside and outside cutting blades. Any of the named arrangements are well known in the art and the present invention is equally applicable to these arrangements. The cutting blades may be positioned in the cutter head 10 by the use of wedges 24 and shims or parallels 26 which control the angular and radial orientation of the blades with respect to the axis 22 of the cutter. It is known in the art to insert the cutting blades into the slots in the cutter head and secure the cutting blades to the cutter head without the use if either shims and/or wedges.

With reference to FIGS. 3 and 4 which illustrate an outside blade, each cutting blade comprises a cutting edge 30 located at the juncture of the front or sharpening face 32 and cutting side surface 34. The cutting edge 30 extends from the base line 33 of the front face 32 to the tip surface 40. Each blade also comprises a non-cutting edge 36, a clearance side surface 38, and a back face 42.

The side and end surfaces on the blades of form-relieved face mill cutters are helicoids. The cross-sections produced by any plane passing through a cutting blade will be the same as the plane moves from the blade front face 32 toward the back face 42 as long as the plane maintains a constant angular relationship with respect to the cutter axis. The positions of the cross-sections will gradually move in a direction toward the front face 11 of the cutter head 10. FIG. 4 shows a sharpening plane 35 located about midway of front face 32 and back face 42 wherein it can be seen that the cross-sectional shape is the same as front face 32 but the position of the cross-section 35 is at a location that would be closer to the face 11 of cutter head 10.

The shank of the cutting blade is generally T-shaped and comprises arms which constitute abutments 44 and 45 and a stem 48. Abutments 44 and 45 include, respectively, surfaces 46 and 47 which seat against the front face 11 of cutter head 10 when the cutter blade is inserted into a slot 18. Each cutter blade is secured to the cutter head 10 by a screw 50 which extends at an angle through opening 51 in the stem 48 and into threaded engagement with the cutter head 10. See FIG. 2.

The angle at which the cutting edge 30 extends relative to the plane $P_T$, which is the plane perpendicular to the cutter radius $R_{C1}$, is known as the blade angle or pressure angle $\phi$ and is shown in FIG. 2. As shown in FIG. 5, the plane $P_{S1}$ that contains the front face 32 and the cutting edge 30 is known as the sharpening plane and the plane $P_{S1}$ is tangent to a circle, D, having the cutter axis 22 passing through its center. The radius $R_{01}$ of the circle D is referred to as the offset distance. The sharpening plane $P_{S1}$ is oriented at an angle K with respect to a line $R_{C1}$ (the cutter radius) extending between the axis 22 and the cutting edge 30 with this angle K being referred to as the offset angle or side rake angle. It can be readily seen that by adjusting the offset distance, $R_{01}$, the side rake angle K and hence the position of the sharpening plane $P_{S1}$ can be controlled. The dotted lines in FIG. 5 illustrate the position of a front face 35 (See FIG. 4 also) that may exist after several sharpenings of the cutter blade. The dotted lines in FIG. 5 are shown, for illustrative purposes, to lie in the same plane of rotation as lines $R_{C1}$ and $R_{01}$. However, in actuality, the dotted lines lie in a lower plane of rotation given the helicoidal form of the cutting blade. Since the offset distance $R_{02}$ is the same as $R_{01}$, and in view of the fact that the cutting blade is in the form of a helicoid thus $R_{C2}=R_{C1}$, the plane $P_{S2}$ will cut a cross-section 35 of the same form and side rake angle K as front face 32.

Figure 6:
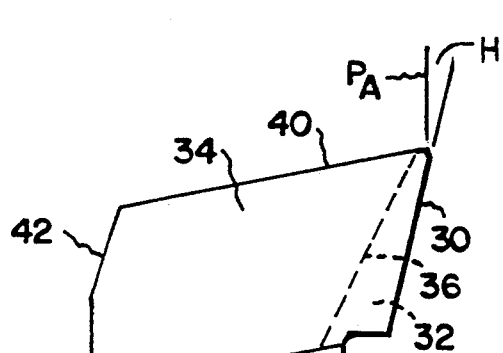
FIG. 6 is a schematic view of an outside cutting blade illustrating the hook angle.
Figure 6:
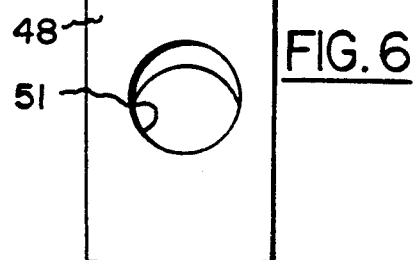

As seen in FIG. 6, the cutting edge 30 may be tilted by controlling the orientation of the sharpening plane $P_{S1}$ with respect to the axis 22. The angle of tilt is referred to as the hook angle, designated angle H, and is defined as the angle between an axial plane, $P_A$, (containing the cutter radius, $R_{C1}$) and the cutting edge 30, when projected into a plane perpendicular to the cutter radius, $R_{C1}$. See FIG. 5. FIG. 6 exemplifies a forward direction of tilt which is referred to as a positive hook angle, however, the front face 32 may be tilted in a rearward direction which is known as a negative hook angle. The hook angle H may be controlled by varying the orientation of the sharpening plane $P_{S1}$ by methods such as those described below.

Figure 7:
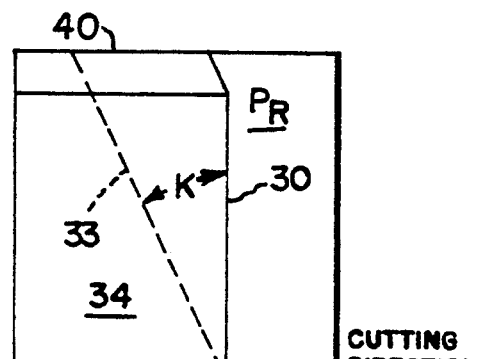
FIGS. 7, 8, 9, and 10 prismatically illustrate an outside cutting blade.

FIGS. 7, 8, 9, and 10 represent prismatic illustrations of an outside cutting blade having a zero hook angle, that is, the cutting edge 30 lies in a plane perpendicular to the cutting direction. FIG. 7 shows an outside cutter blade having cutting side surface 34 and tip surface 40 projected into a plane, $P_R$ (the plane of the page), which is parallel to the plane of cutter rotation and perpendicular to the cutter axis 22. In FIG. 7, since there is a zero hook angle, projected cutting edge 30 is coincident with the cutter radius, $R_C$, and therefore lies in the axial plane $P_A$. Line 33 is the base of the front face and is also the line of intersection of the sharpening plane $P_S$ and the plane $P_R$. Offset or side rake angle K is shown extending between the sharpening plane $P_S$ (line 33) and the cutter radius coincident with cutting edge 30. See FIG. 5 also. It is to be understood that angle K can be defined at any point along the height of the cutting edge 30 and need not be limited to being defined at the base 33. Angle K is the angle between the sharpening plane, $P_S$, at any point along the cutting edge 30, and the cutter radius at that point.

Figure 8:
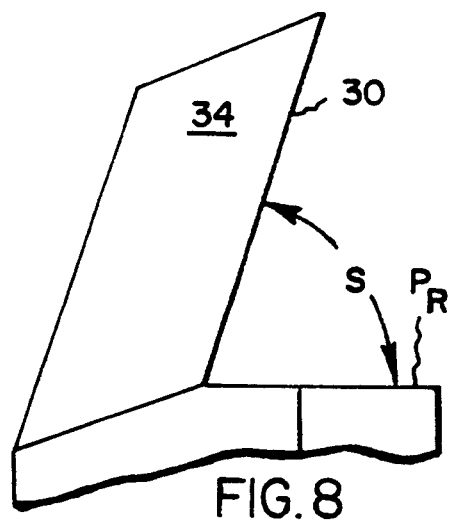

FIG. 8 illustrates a view along line 33 of FIG. 7. This figure illustrates angle S which is the angle between the plane $P_R$ and the sharpening plane, which contains the front face 32, and is measured in a plane perpendicular to both planes $P_R$ and the sharpening plane.

Figure 9:
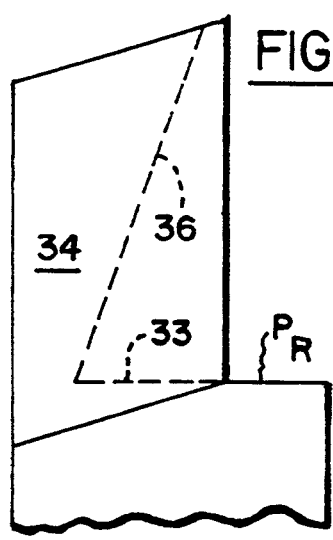

FIG. 9 depicts a side prismatic view of cutting side surface 34 with clearance edge 36 and base line 33 illustrated by the dotted lines.

Figure 10:
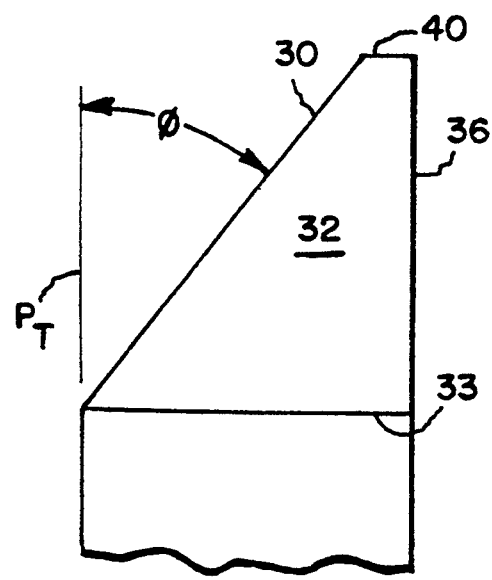

FIG. 10 is a view of the front face 32 of the cutting blade showing base line 33, clearance edge 36, tip surface 40, and cutting edge 30. Pressure angle $\phi$ is shown extending between cutting edge 30 and the plane, $P_T$, which is perpendicular to the cutter radius at the cutting edge 30.

The hook angle, H, (see FIG. 6) can be controlled and manipulated by adjusting the position and orientation of the sharpening plane $P_S$ which contains the front face 32 of the cutting blade. In turn, a change in the pressure angle $\phi$ of the cutting edge 30 accompanies the change in hook angle. Hook angle change is brought about by changing offset angle or side rake angle K, angle S, or a combination thereof.

Figure 11:
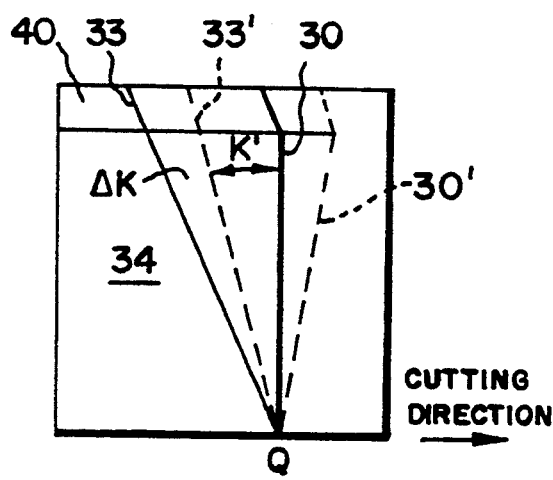
FIGS. 11, 12, 13, and 14 prismatically illustrate the effects on hook angle H and pressure angle $\phi$ resulting from a change in offset angle K.

FIGS. 11, 12, 13, and 14 illustrate the preferred procedure for changing the hook angle H by changing the offset angle K and show the accompanying effects of such a change on the pressure angle of the cutting blade. In FIG. 11, the sharpening plane (represented by line 33) is repositioned to the location denoted by 33'. This is accomplished by adjusting the offset distance, $R_O$, (See FIG. 5) which in effect amounts to pivoting the sharpening plane about the outermost point on the cutting edge 30 designated point Q in FIG. 11. This movement of the sharpening plane through an angle $\Delta K$ results in a new offset angle K' being established with respect to the axial plane and initial cutting edge 30 and shifts the cutting edge 30 to a new location 30' as shown in FIG. 11.

Figure 12:
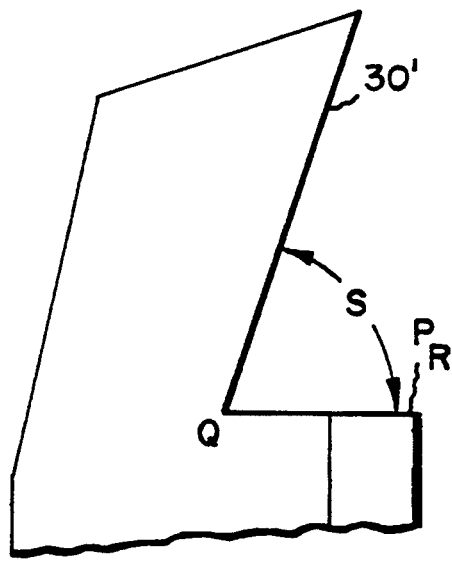

FIG. 12 is a view taken along line 33' of FIG. 11 and illustrates the angular orientation of the cutting edge 30', and hence the sharpening plane, as a result of the angle K change. The angle S is held constant during the angle K change and therefore the angular orientation between the sharpening plane and the plane, $P_R$, parallel to the plane of cutter rotation, remains unchanged.

Figure 13:
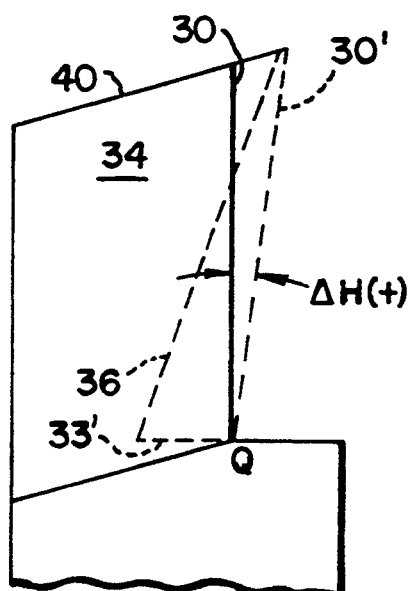

FIG. 13 represents a side view of the cutting blade and shows the effect of the $\Delta K$ change on the hook angle. It can be seen that the decrease in the angle K, while holding angle S constant, results in a positive change $\Delta H$ in the hook angle. In other words, repositioning of the sharpening plane as shown in FIG. 11 has the effect on the hook angle as illustrated in FIG. 13.

Figure 14:
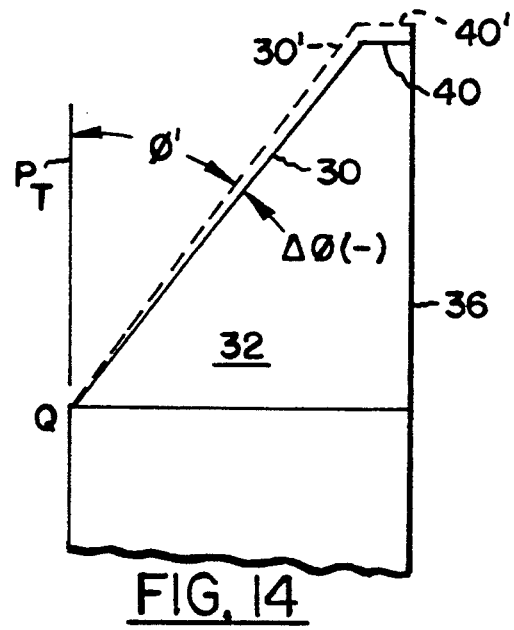

Given the helicoidal form of the cutting blade, the change in hook angle H is accompanied by a change in the pressure angle $\phi$ as shown by FIG. 14. By the positive change in hook angle H, the position of the front face 32 relative to its position prior to the $\Delta K$ change is shown by the dotted lines. The result of the change in angle K is the effective addition of stock material to the front face of the cutting blade as illustrated by FIG. 13. In the helicoidal form of an outside cutting blade, adding stock material has the effect of shifting the position of the front face further away from the cutter head and outward with respect to the axis of rotation. FIG. 14 shows that the cutting edge 30 has shifted outwardly to a new position 30' and tip surface 40 has shifted further away from the cutter head to a new position 40'. The relative effect of the repositioning is that a negative pressure angle change $\Delta\phi$ has occurred and a new pressure angle $\phi'$ now exists on the cutting blade. Of course it can be seen that a change in angle K in an opposite manner to that shown in FIG. 11 will have an effect opposite to that shown in FIGS. 13 and 14.

Figure 15:
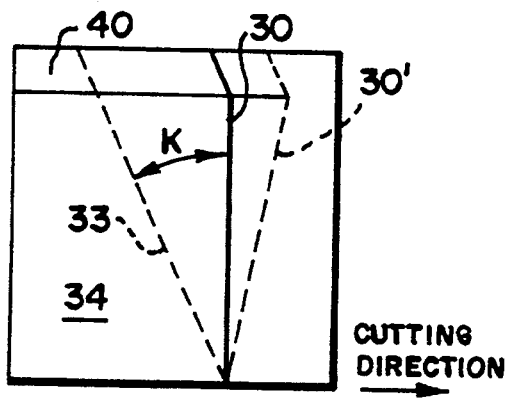
FIGS. 15, 16, 17, and 18 prismatically illustrate the effects on hook angle H and pressure angle $\phi$ resulting from a change in angle S.

FIGS. 15, 16, 17, and 18 illustrate an alternative procedure for controlling the hook angle H and the accompanying effect thereof on the pressure angle $\phi$. This procedure involves varying angle S while holding angle K constant. FIG. 15 shows a prismatic representation of the net effect where angle K is unchanged but the position of the sharpening plane, and hence the front face and cutting edge 30, is reoriented. This is accomplished by adjusting angle S, that is, adjusting the angular orientation of the sharpening plane with respect to a plane, $P_R$, parallel to the plane of cutter rotation. This change amounts to pivoting the sharpening plane about line 33 which is at the base of the front face and is also the line of intersection of the sharpening plane with the plane parallel to the plane of rotation of the cutter head.

Figure 16:
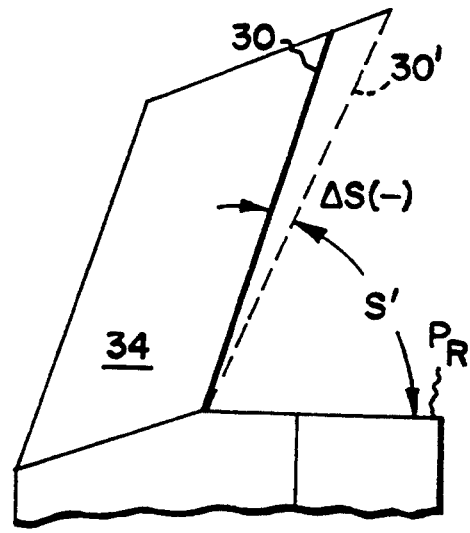

FIG. 16 is a view taken along line 33 of FIG. 15 and illustrates a negative change in angle S. The sharpening plane, and therewith the front face and cutting edge 30, is angularly adjusted by an amount AS thus resulting in a new angle S' and a new position for the cutting edge designated 30'.

Figure 17:
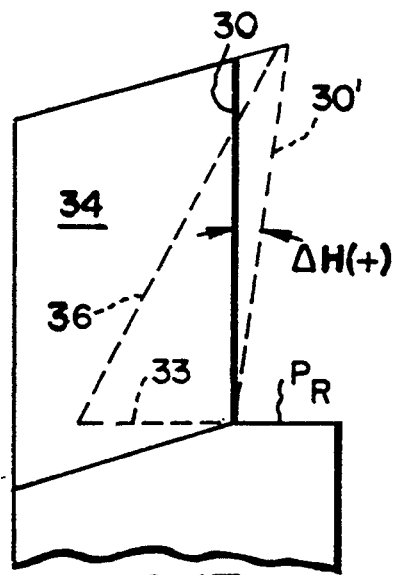
Figure 18:
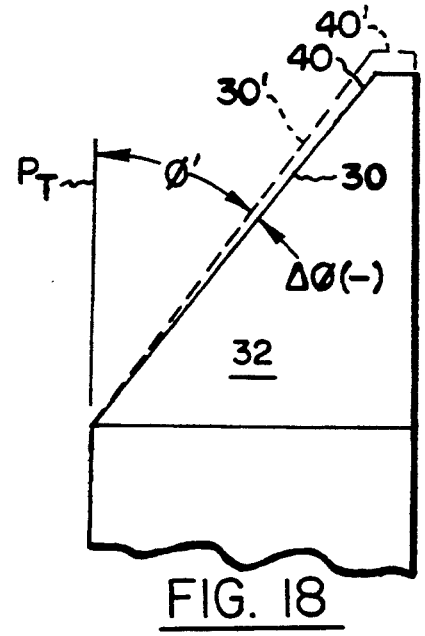

FIGS. 17 and 18 show that the change in angle S results in a positive change in the hook angle $\Delta H$ which in turn effectively represents the addition of stock material to the front face of the cutting blade and a shifting of the cutting edge to the location designated 30' and tip surface to the location 40'. The net effect on the pressure angle is a negative change $\Delta\phi$ resulting in a new pressure angle $\phi'$. Of course, by adjusting angle S in a manner opposite that discussed above and shown in FIG. 16, opposite effects on the hook and pressures angles can be realized.

Modification of the hook angle H and, therewith, the pressure angle $\phi$ may be accomplished by either a change in offset angle K, a change in angle S or a combination thereof. The changes discussed above with reference to an outside cutting blade are equally applicable to inside cutting blades.

Figure 19:
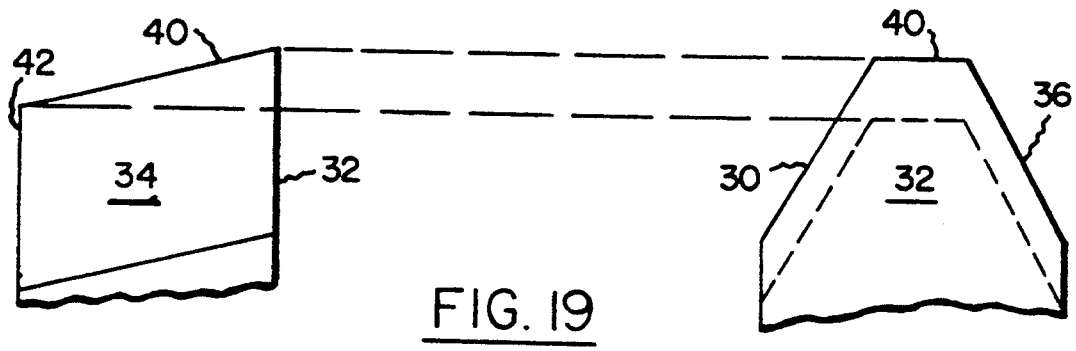
FIGS. 19, 20, and 21 diagrammatically illustrate the relationship between hook angle changes and pressure angle changes.
Figure 20:
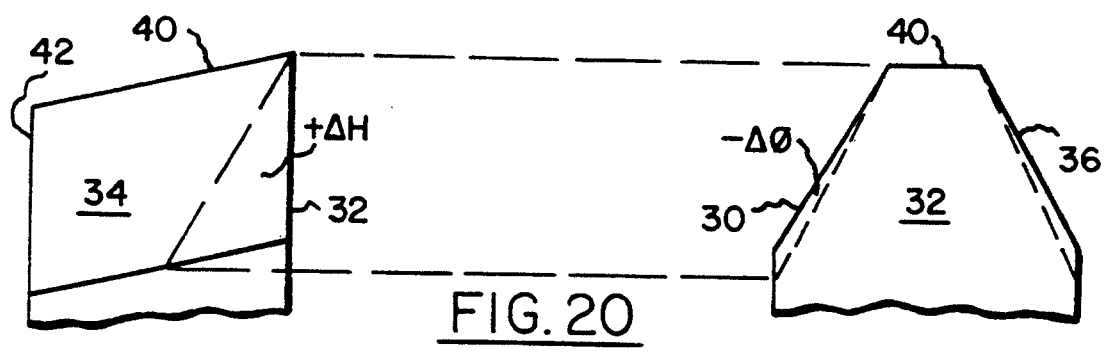
Figure 21:
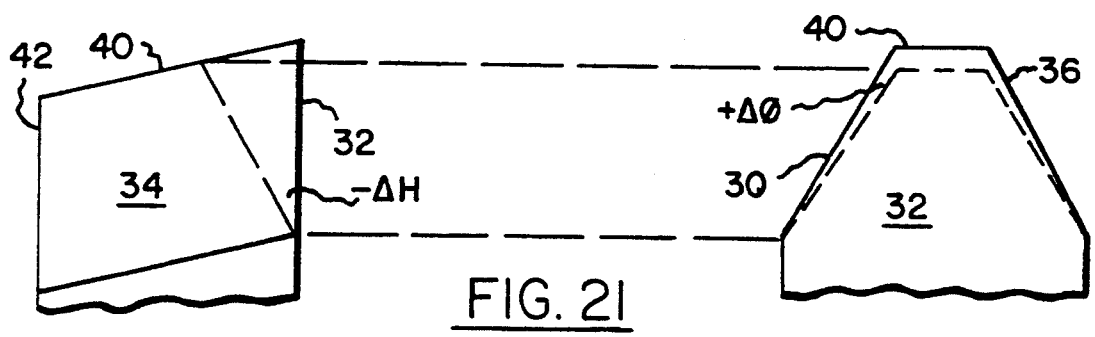

FIGS. 19, 20 and 21 show various hook angle changes and their accompanying effects on the pressure angle of the cutting blades. FIG. 19 illustrates zero degree hook angle. It can be seen by the dotted lines that as the cutting blade is sharpened back toward the back face 42, the front face 32 maintains the same cross-sectional shape with no pressure angle change and that the front face 32 and the cutting edge 30 move inward and downward relative to its original position. This is a pure radial change and is due to the helicoidal shape of the cutting blade wherein, as previously discussed, the position of the front face 32 moves in a direction toward the front surface 11 of the cutter head 10 as the blade is sharpened. When all blades in a cutter are sharpened back, the front faces 32 of the all blades move toward the front surface 11 of the cutter head 10, however, the relative positions of the blades with respect to one another do not change.

FIG. 20 illustrates a positive hook angle change AH wherein it is seen that such a modification results in a negative pressure angle change $\Delta\phi$. In other words, it is seen that as the sharpening plane $P_{S1}$ is adjusted as shown, the effect is that more stock material is removed toward the base of the cutting face 32. Conversely, the same effect can be realized by adding stock material to the upper portion of the blade as illustrated in FIGS. 14 and 18 for example. The net effect on the cutting face 32 is that the lower portions of the edges 30 and 36 move inward relative to their original positions by an amount proportional to the amount of stock removed by the change in hook angle $\Delta H$. The greatest amount of stock removed is near the bottom of the blade hence the greatest amount of inward movement of the edges 30 and 36 is also near the bottom of the front face 32.

In an opposite manner, FIG. 21 illustrates a negative hook angle change $\Delta H$ which results in a positive pressure angle change $\Delta\phi$ on the blade front face 32. The change in the position of the sharpening plane $P_{S1}$ is adjusted such that more stock material is removed near the tip 40 of the blade. The effect on the front face 32 of the blade being that the edges 30 and 36 move inwardly relative to their original positions with the greatest amount of inward movement being near the tip 40 of the front face 32 which is expected since the greatest amount of stock material was removed near the top of the blade.

It can be seen that by varying the positions and orientations of the sharpening plane, the position of each blade cutting edge can thereby be controlled. With outside blades, for example, if it is discovered that the cutting edge 30 of one blade is located at a greater radial distance from the cutter axis 22 relative to the cutting edges of the remaining blades, sharpening back the entire front face 32 of that one blade by a predetermined amount will result in the entire cutting edge 30 moving inwardly (see FIG. 19) and the cutting edge 30 can be correctly repositioned with respect to the remaining blades. In another example, it can be seen that if the pressure angle of a cutting edge 30 is misaligned with respect to those of the remaining blades, repositioning the sharpening plane to effect a change in hook angle for that blade will result in an accompanying change of pressure angle and allow the correct pressure angle to be attained.

As previously stated, a cutting blade is positioned in the slot 18 by the use of particular wedges 24 and shims or parallels 26. The shims 26 are used to control the radial position of the cutting edge 30 with respect to the axis 22. The wedges 24 are used to make very small radial position changes and small angular orientation changes. Cutter head 10 includes a slightly tapered edge surface 13. Wedge 24 is a tapered element which includes one surface being nominally complementary with edge surface 13 and another surface which is parallel to the cutter axis 22 when the nominally complementary surfaces are placed next to one another. Small radial adjustments of each cutting blade can be achieved by loosening the screw 50 and turning the wedge-adjusting screw D2 (See FIG. 2) which is engaged in a recess 54 in the wedge 24. Turning of wedge-adjusting screw 52 urges the wedge 24 either toward or away from the cutter face 11, depending upon the direction turned, thus causing the radial position of the cutting blade to be varied. Once the desired radial position is achieved, screw 50 is tightened thus maintaining the desired position.

To date, sharpening of form relieved cutters has involved a uniform removal of stock from the face of each blade. Following the sharpening, the cutter undergoes truing wherein the radial and angular position of each blade is measured and compared to a master blade which is one of the blades located in the cutter head. The radial position of each blade is adjusted by the up or down movement of the adjusting wedges. The angular orientation of each blade is altered by installing a wedge with a slightly different included angle. This mechanical truing and angling procedure requires great skill and consumes much time.

The present invention incorporates the truing and angling process into the sharpening process. The radial and angular position of each blade is controlled by removal of predetermined amounts of stock material thereby eliminating the tedious and time consuming prior art approach of mechanically adjusting each individual blade.

As stated above, the present process is applicable to form-relieved cutters having inside blades, outside blades, both inside and outside blades, and/or other types of form-relieved blades. If a cutter has groups of like blades, such as both inside and outside blades, all like blades are sharpened in one operation. By like blades it is meant that all blades of the same form are sharpened together, for example, all inside blades are sharpened together and all outside blades are sharpened together. For the purposes of the present invention, a group of like blades is defined as one or more blades of the same form. The sequence of blades groups to be sharpened does not matter. A group of inside blades may be sharpened before the group of outside blades or vice versa.

Figure 22:
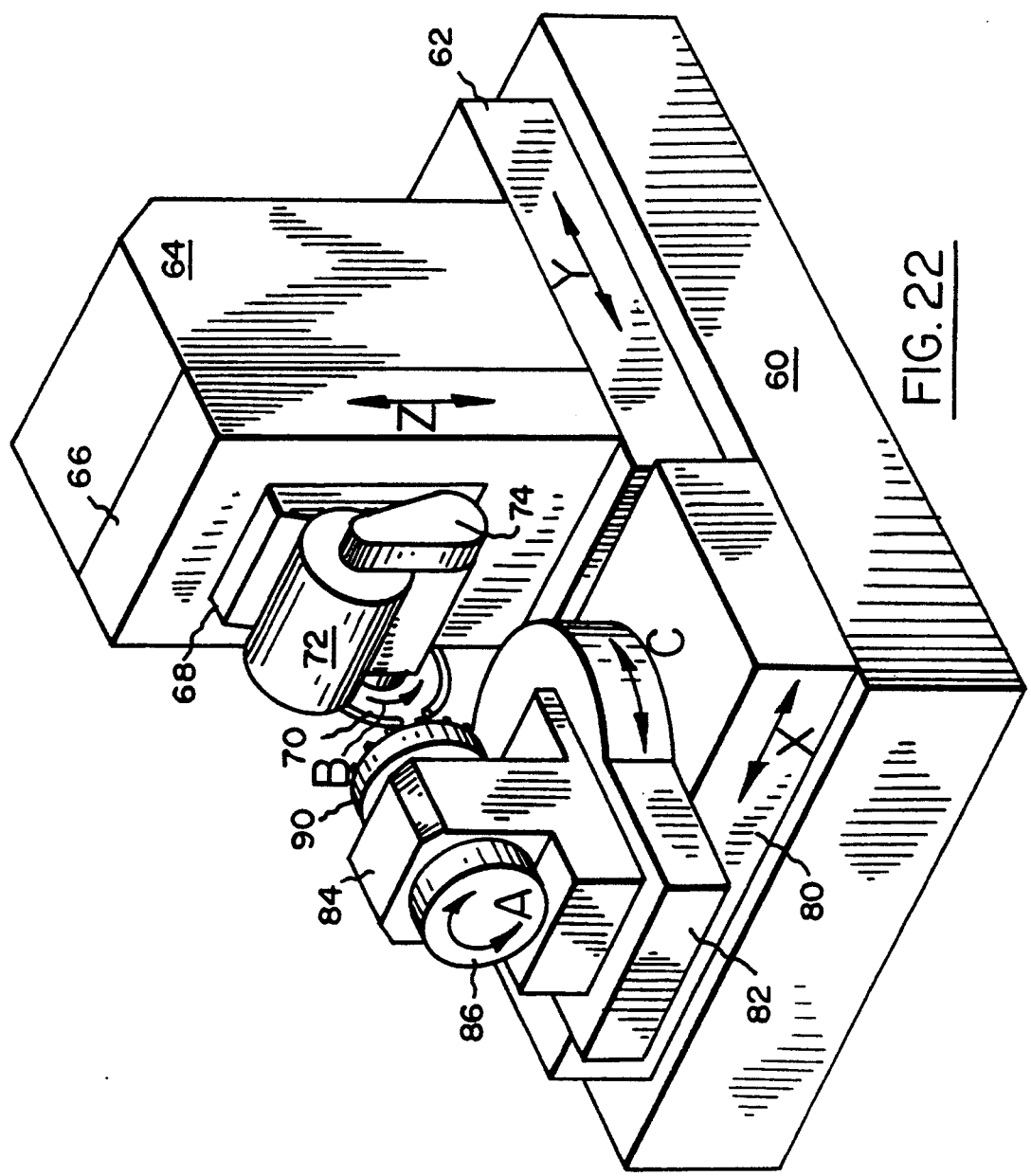
FIG. 22 schematically illustrates a machine for carrying out the present inventive process.

A sharpening or grinding machine for carrying out the present inventive process is schematically illustrated by FIG. 22. A preferred machine for carrying out the present inventive process is one having computer numerical control (CNC), an example of which is described below. Such machines are well known in the art and are readily available.

The machine comprises a base 60 upon which a tool carriage 62 is mounted via slides or ways (not shown). The tool carriage 62 is movable on the slides along the machine base 60 in a direction Y (Y-axis). Located on tool carriage 62 is a tool column 64 to which is mounted tool slide 66, via ways or slides (not shown), for movement in a direction Z (Z-axis) perpendicular to the Y-axis movement of tool carriage 62. A tool head 68 is secured to tool slide 66 and an appropriate stock removing tool, such as a grinding wheel 70, is mounted for rotation to the tool head 68. The grinding wheel 70 is rotatable about an axis B and is driven by a motor 72 acting through suitable reduction gearing 74.

Also mounted via slides or ways (not shown) to machine base 60 is a first workpiece carriage 80 which is movable along the machine base 60 in a direction X (X-axis) perpendicular to both the Y-axis and Z-axis movements. A second workpiece carriage 82 is pivotably mounted to the first workpiece carriage 80 and is pivotable about an axis C. Secured to the second workpiece carriage 82 is workpiece column 84 in which a spindle (not shown) is journaled for rotation about axis A and is driven by motor 86. A cutter 90 is releasably mounted to the spindle for rotation about the A-axis.

Relative movement of the tool 70 and cutter 90 along each of the mutually perpendicular axes X, Y, and Z is imparted by respective drive motors (not shown) which act through speed reducing gearing and recirculating ball screw drives (not shown). Pivoting of the second workpiece carriage 82 about the C-axis is imparted by a drive motor (not shown) acting through a worm which engages with a worm wheel carried by the pivotable workpiece carriage 82.

Each of the respective drive motors, except the tool drive motor 72, is associated with either a linear or rotary encoder as part of a CNC system which governs the operation of the drive motors in accordance with input instructions input to a computer. The encoders provide feedback information to the computer concerning the actual positions of each of the movable machine axes. CNC systems for controlling the movement of multiple machine axes along prescribed paths are now commonplace. Such state-of-the-art systems are incorporated in the present invention to control movements of selected axes along selected paths for sharpening the blades of a form-relieved face mill cutter in accordance with the present inventive process.

The present inventive process begins by providing an essentially defect-free front face 32 and cutting edge 30 on each blade of a particular blade group, for example, inside blades or outside blades. If the blades are worn from cutting, a uniform amount of stock is removed from the front face 32 of each blade, by grinding for example. However, there are occasions when truing and angling must be checked on a new cutter, such as after shipping and handling, and in this instance a clean front face and cutting edge already exists on the blades and further stock removal is not necessary.

Figure 23:
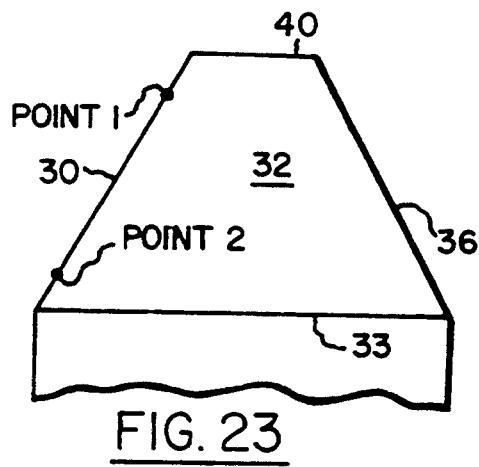
FIG. 23 shows locations of points to be measured on the cutting edge of a blade.

The cutting edge 30 of each blade from the selected blade group is then probed at a first point (Point 1) near the tip 40 (FIG. 23) by the use of a non-contacting and/or a contacting probe with a non-contacting probe being preferred. Point 1 is generally located at about one-third ($\frac{1}{3}$) of the cutting depth of the cutting blades. The purpose of probing at the upper Point 1 is to determine the radial positions of each blade relative to the cutter axis 22 and to one another. After a point near the tip 40 is selected as shown in FIG. 23 and a measurement device has been positioned to make measurements at that point, each blade is moved past the measuring device to obtain a position reading of a first point on its cutting edge with all first points lying in the same plane of rotation about the cutter axis. The positions of the Point 1 for each blade are stored by the computer.

The stored points are then compared and the lowest blade is selected. By the term "lowest blade" it is meant the blade which, for inside blades, has Point 1 and hence the cutting edge located farthest from the cutter axis 22. For outside blades, the term "lowest blade" is intended to set forth the blade which has Point 1 and hence the cutting edge closest to the cutter axis 22. The lowest blade is selected and designated for reference purposes as the "zero blade" and the relative differences between the position of Point 1 of each remaining blade and the position of Point 1 of the lowest blade are calculated and stored.

For Point 1, since the lowest blade is either closest or farthest from the axis 22, the differences for each blade in a group are all assigned a positive value. The difference for each remaining blade is the amount that the cutting edge of each remaining blade must be moved radially with respect to the lowest blade in order that all cutting edges will follow the same path, that is, so that all cutting edges will track one another. In other words, all blades except the lowest blade and those within acceptable tolerances thereof will require an amount of stock to be removed from their respective front faces in order that the new cutting edge will fall within the accepted tolerances of the lowest blade. The calculated difference for each remaining blade is added to the respective original angular sharpening position of each remaining blade and the position of a new Point 1 is obtained and stored for each remaining blade.

It is emphasized that once the new first points are determined, their positions must be held at the calculated locations in order for the radial positions of each blade to be the same. If the position of Point 1 of any one blade is changed after the new points are calculated, the Point 1 positions of all blades must be changed by a like amount in order to maintain correct radial distances.

The next step in the present inventive process is probing at a second point (Point 2) on the cutting edge 30 located near the base 33. See FIG. 23. Point 2 is generally located at about three-fourths (¾) the cutting depth of the cutting blades. The purpose of this step is to check the angular orientation of each cutting edge 30. After a point near the base 33 is selected as shown in FIG. 23 and a measurement device has been positioned to make measurements at that point, each blade is moved past the measuring device to obtain a position reading of a second point on its cutting edge with all second points lying in the same plane of rotation about the cutter axis.

The positions of Point 2 for each blade are stored by the computer. The lowest blade with regard to Point 1 is selected as the reference blade and the position of the second point on the cutting edge on this blade is designated for reference purposes as the "zero location". The differences between the positions of the second point of the lowest blade and the second point of each of the remaining blades are calculated and stored. Unlike the Point 1 differences wherein all remaining blades are "higher" than the lowest blades, Point 2 differences for the remaining blades may be positioned either positive or negative with respect to Point 2 of the lowest blade. Therefore it is important that positive and negative conventions be assigned and maintained throughout the present inventive process.

The differences for Point 2 for each remaining blade are subtracted from the respective original Point 2 position for each remaining blade and a new Point 2 is calculated.

With new first and second points calculated for each cutting edge 30, except for the lowest blade, the cutting edges for all blades based on these new points are determined and these cutting edges will follow the same path. The process may then be repeated for any or all additional groups of like blades. It is to be understood that if the Point 1 difference and/or the Point 2 difference between any remaining blade and the reference blade is within an acceptable predetermined tolerance amount, a new Point 1 and/or Point 2 need not be established in view of the acceptable deviation from the reference blade. However, new first and/or second points may be established regardless of the measured deviation.

Figure 24:
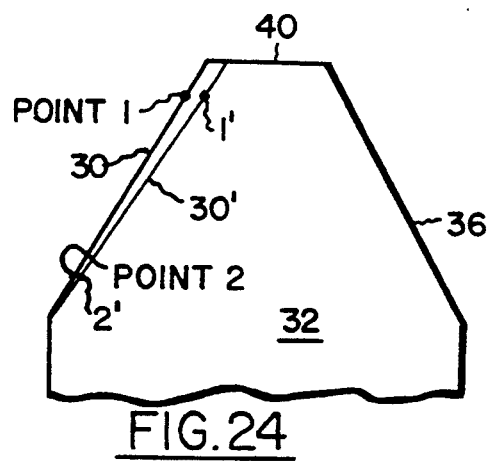
FIGS. 24 and 25 illustrate examples of new cutting edges formed in accordance with the present process.
Figure 25:
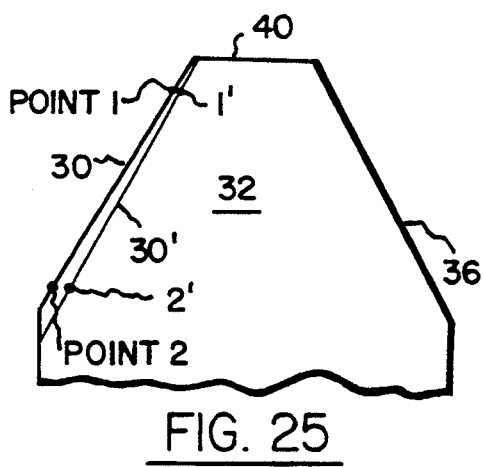

FIGS. 24 and 25 illustrate examples of new cutting edges 30' based on new points 1' and 2'. In FIG. 24, new points 1' and 2' have been calculated and a new cutting edge 30' based on these new points has been determined. In this case the new cutting edge 30' is formed by repositioning the sharpening plane which effects a negative hook angle change ΔH, with respect to original cutting edge 30. The negative hook angle change is accompanied by a positive pressure angle change Δφ similar to that shown in FIG. 21. In FIG. 25, new points 1' and 2' have been calculated and new cutting edge 30' has been determined. Cutting edge 30' is formed by repositioning the sharpening plane for effecting a positive hook angle change ΔH, with respect to original cutting edge 30, which is accompanied by a negative pressure angle change Δφ similar to that shown in FIG. 20.

For some blades it may be necessary for only a radial change to be effected. This situation arises when the angle of the cutting edge is satisfactory but the position of the cutting edge needs to be moved to a position parallel to the initial probed position, that is, a purely radial position change is required. See FIG. 19 for an illustration of a radial change. In this instance, the sharpening plane is repositioned rotationally about the cutter axis, in a manner similar to that shown in FIG. 5, to shift the cutting edge to a location paralleling its original position.

Figure 26:
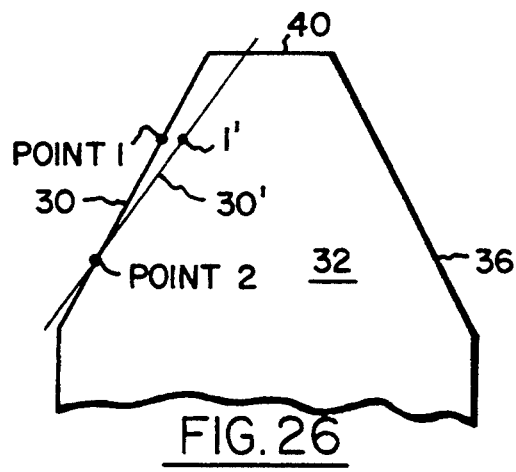
FIGS. 26, 27, and 28 illustrate examples of the positions of new cutting edges wherein additional stock material is required.
Figure 27:
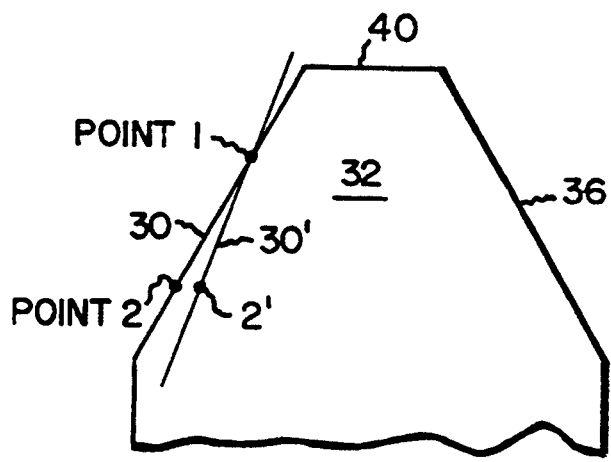
Figure 28:
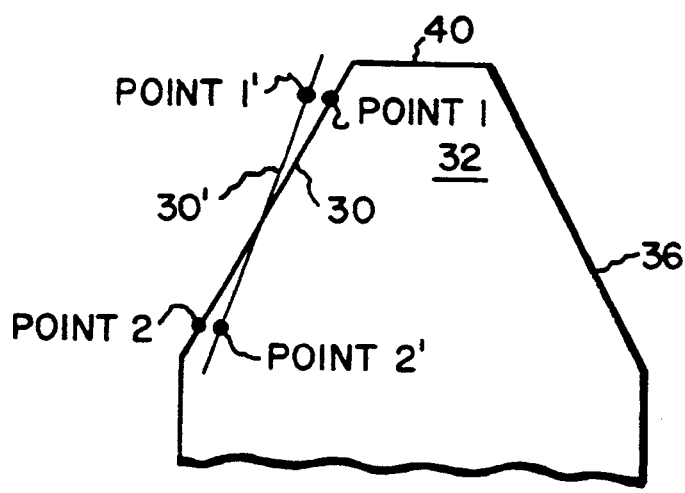

In some instances a cutting blade may not have sufficient stock material with respect to the original cutting surface to allow for formation of the new cutting surface. FIGS. 26, 27, and 28 illustrate examples of new cutting surfaces wherein sufficient stock material is not present to allow for their formation.

In FIG. 26 it is seen that Point 2 does not require repositioning but due to the new location of point 1', additional stock material is needed to forth new cutting edge 30' between Point 2 and the base of the cutting edge.

FIG. 27 illustrates the opposite situation of FIG. 26. In this case new Point 2' has been determined and Point 1 is correctly positioned and therefore no new Point 1' is needed. However, in order to accommodate new cutting edge 30', additional stock material is needed between Point 1 and the tip 40.

In FIG. 28 both Points 1 and 2 have been repositioned. Point 2'0 has moved inwardly while the position for new Point 1' is at a location where no stock is present to support the new cutting edge 30'.

Figure 29:
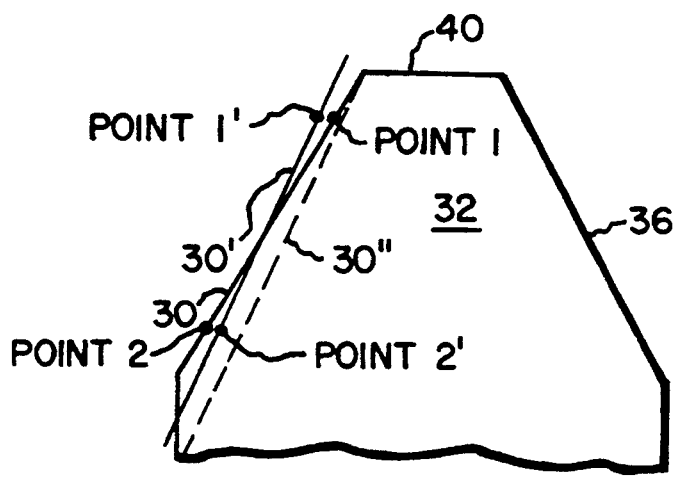
FIG. 29 illustrates a new cutting edge wherein additional stock material has been provided to allow for its formation.

The solution to the circumstance wherein additional stock is required is illustrated in FIG. 29. When additional stock material is needed for formation of a new cutting edge, the entire cutter is rotated forward by an amount sufficient to supply adequate stock material for every blade. The minimum amount of rotation being such that the blade requiring the greatest amount of additional stock is provided with the required stock. For example, with outside blades, rotating the cutter forward causes the cutting edge 30 to effectively move inwardly with respect to the cutter axis. FIG. 19 shows the inward movement of the cutting edge 30 as the length of an outside blade is traversed. It can be clearly seen that for inside blades, the effect of forward cutter rotation on the cutting edge would result in movement of the cutting edge in a direction opposite that of the outside blades. Namely, the cutting edge of an inside blade would shift outwardly with respect to the cutter axis.

In FIG. 29 it can be seen that there is insufficient stock material from which to form new cutting edge 30'. However, when the cutter is rotated forward by a predetermined amount, new cutting edge 30' effectively moves inwardly to the dotted line location denoted by line 30". With the cutting edge shifted to this position, enough stock is present to allow the formation of a complete cutting edge profile. It must be remembered that once the cutter is rotated forward by some predetermined amount, all blades will have additional stock material thereon including the lowest blade. If this additional stock is not needed on any blade for the formation of a new cutting edge, it must be removed by a uniform grinding of the cutting face 32 keeping in mind that the relative position of Point 1 of all blades must be the same.

When sharpening cutters that have both inside blades and outside blades, the amount of material removed from the front faces of the blades should be controlled such that the tips of all blades will essentially lie in a plane of rotation within a tolerance of about 0.002 inches (0.0508 mm). If the tips of one group of blades, either inside or outside for example, are determined to be higher than the tips of the blades in the other group or groups of blades, a uniform amount of stock material is usually removed from the front face of each blade in the higher group thereby lowering the tips (see FIG. 19) relative to the blades of the other lower group or groups while maintaining equal spacing between blades of the high group. The height of the blades is usually determined by probing, either contacting or non-contacting.

By the present invention the radial and/or angular position of each blade in a form-relieved face mill cutter can be individually adjusted as a part of the sharpening process without the need to physically reposition each blade by changing or adjusting wedges.

Though the present invention has been discussed with reference to cutters having removable blades it is to be understood that solid one-piece cutters may also be sharpened according to the present inventive process. The present process being ideal for correcting any dimensional inaccuracies occurring during the formation of the solid cutter. Although the present invention has been discussed with references and examples to outside cutting blades, the present invention is equally applicable to inside blades also.

While the invention has been described with reference to preferred embodiments it is to be understood that the invention is not limited to the particulars thereof. The present invention is intended to include modifications which would be apparent to those skilled in the art to which the subject matter pertains without deviating from the spirit and scope of the appended claims.

What is claimed is:

1. A method of radially truing and angling cutting blades of a form-relieved face mill cutter having an axis of rotation, each of said cutting blades having a front face, a cutting edge, said front face and said cutting edge being in a sharpening plane, said method comprising:
    removing a predetermined amount of stock material from the front face of at least one of said cutting blades whereby at least one of radial positioning and angular positioning of the cutting edge of said at least one of said cutting blades with respect to the remaining cutting blades is controlled such that said cutting edge of each of said cutting blades follows essentially a same path when said cutter is rotated about said axis of rotation,
    said method eliminating separate mechanical adjusting of said at least one of said cutting blades as a means to control radial and angular positions.

2. The method of claim 1 wherein said at least one of radial positioning and angular positioning of the cutting edge comprises repositioning the sharpening plane of at least one of said cutting blades.

3. The method of claim 2 wherein said repositioning of the sharpening plane comprises adjusting at least one of an offset angle K and an angle S of said sharpening plane to effect a pressure angle change of said cutting edge.

4. The method of claim 2 wherein said repositioning of the sharpening plane effects a radial shifting of said cutting edge.

5. The method of claim 1 further comprising rotating said cutter an amount to provide sufficient stock material for said removing a predetermined amount of stock material.

6. A method of sharpening cutting blades of a form-relieved face mill cutter wherein said sharpening includes radial truing and angling of said blades, said method comprising:
    providing a form-relieved face mill cutter having an axis of rotation and a plurality of blades, said plurality of blades comprising at least one group of like blades, each of said plurality of blades comprising a front face having a tip, a base and two edges, one of said two edges being a cutting edge with said cutting edge extending from said tip of said front face to said base of said front face, said front face and said cutting edge being in a sharpening plane,
    providing an essentially defect-free front face and cutting edge,
    probing the cutting edge of each like blade of said one group at a first point near said tip of said front face to determine a first point location and storing said location of said first point of said each blade,
    comparing the first point locations of all like blades of said one group and selecting one blade having a lowest first point location from said all like blades,
    calculating a first point difference between said lowest first point location of said one blade and the location of the first point of each remaining like blade and storing each said first point difference for said each remaining like blade,
    establishing a new first point location for said each remaining like blade, when said first point difference exceeds a predetermined tolerance amount, by subtracting said first point difference for said each remaining like blade from the respective location of said first point for each said remaining like blade whereby for said each remaining like blade, the location of each said new first point is substantially the same as said lowest first point location of said one blade,
    probing the cutting edge of said each like blade at a second point near said base of said front face to determine a second point location and storing said location of said second point of said each like blade,
    comparing the location of said second point of said each remaining like blade with the location of the second point of said one blade,
    calculating a second point difference between said second point location of said one blade and the location of said second point for said each remaining like blade,
    establishing a new second point location for said each remaining like blade, when said second point difference exceeds a predetermined tolerance amount, by subtracting said second point difference of said each remaining blade from the respective second point location of said each remaining like blade, calculating a new cutting edge for said each remaining like blade based upon said new first point and said new second point for said each remaining like blade, removing stock material from said each remaining like blade to form a new cutting edge thereon whereby said new first and second points for said each remaining like blade lie on said new cutting edge, said removing stock material comprising repositioning the sharpening plane of said each remaining like blade.

7. The method of claim 6 wherein said providing an essentially defect-free front face and cutting edge comprises removing a uniform amount of stock material from said front face of each of said plurality of blades.

8. The method of claim 6 wherein said repositioning the sharpening plane comprises effecting a hook angle change and its accompanying change in pressure angle to form said new cutting edge.

9. The method of claim 8 wherein said repositioning the sharpening plane comprises adjusting at least one of an offset angle K and an angle S of said sharpening plane.

10. The method of claim 9 wherein said repositioning comprises adjusting said offset angle.

11. The method of claim 6 wherein said at least one group comprises one of inside blades and outside blades.

12. The method of claim 6 wherein said process is repeated for at least one additional group of like blades.

13. The method of claim 12 wherein said at least one group comprises one of inside blades and outside blades and said at least one additional group comprises the other of inside blades and outside blades.

14. The method of claim 13 further including controlling blade height of said one group of like blades relative to said additional group of like blades.

15. The method of claim 14 wherein said controlling blade height comprises:

probing the tip of each blade of each group of like blades, determining a highest group from said each group, uniformly grinding the face of each blade in said highest group thereby lowering the height thereof relative to the height of the blades not in said highest group whereby the tip of said each blade of each group rotates in essentially same plane of rotation.

16. The method of claim 6 wherein said probing is performed with a contacting probe.

17. The method of claim 6 wherein said probing is performed with a non-contacting probe.

18. The method of claim 6 wherein said repositioning the sharpening plane effects a radial position change in said cutting edge.

19. The method of claim 6 further comprising rotating said cutter an amount to provide sufficient stock material for said repositioning of the sharpening plane to form said new cutting edge.

20. The method of claim 6 further comprising said cutting blade having a cutting depth and wherein said first point is located on said cutting edge at about one-third of the cutting depth of the cutting blade.

21. The method of claim 6 further comprising said cutting blade having a cutting depth and wherein said second point is located on said cutting edge at about three-fourths of the cutting depth of the cutting blade.

22. In a method of sharpening cutting blades of a form-relieved face mill cutter comprising:

providing a form-relieved face mill cutter having an axis of rotation and a plurality of blades, said plurality of blades being at least one of inside cutting blades and outside cutting blades, each of said blades comprising a front face having a top, a base and two edges, one of said two edges being a cutting edge with said cutting edge extending from said top of said front face to said base of said front face, said front face and said cutting edge being in a sharpening plane, wherein the improvement comprises:

truing and angling said blades as a part of the sharpening process, said truing and angling including;

selecting said inside cutting blades or said outside cutting blades, probing the cutting edge of each of the selected blades at a first point near said top of said front face to determine a first point location and storing said location of said first point of said each blade, determining one blade having a lowest first point location from all said selected blades, calculating a first point difference between said lowest first point location of said one blade and the location of the first point of each remaining selected blade and storing each said first point difference for said each remaining selected blade, establishing a new first point location for said each remaining selected blade by subtracting said first point difference for said each remaining selected blade from the respective location of said first point for each said remaining selected blade whereby for said each remaining selected blade, the location of each said new first point is substantially the same as said lowest first point location of said one blade, probing the cutting edge of said each selected blade at a second point near said base of said front face to determine a second point location and storing said location of said second point of said each like blade, comparing the location of said second point of said one blade with the location of the second point of each of the remaining like blades, calculating a second point difference between said second point location of said one blade and the location of said second point for said each remaining like blade, establishing a new second point location for said each remaining like blade by subtracting said second point difference of said each remaining blade from the respective second point location of said each remaining like blade, calculating a new cutting edge for said each remaining like blade based upon said new first point and said new second point for said each remaining like blade, repositioning the sharpening plane of said each remaining like blade to form a new cutting edge thereon whereby said new first and second points for said each remaining like blade lie on said new cutting edge defined by the repositioned sharpening plane.

23. The method of claim 22 wherein said repositioning the sharpening plane effects a change in pressure angle of said cutting edge.

24. The method of claim 23 wherein said repositioning the sharpening plane comprises changing at least one of an offset angle K and an angle S.

25. The method of claim 22 wherein said repositioning of the sharpening plane effects a radial position change of said cutting edge.

26. The method of claim 25 wherein said repositioning of the sharpening plane further effects a change in pressure angle of said cutting edge.

27. The method of claim 22 wherein said probing is performed with a non-contacting probe.

28. The method of claim 22 wherein for said each remaining like blade, at least one of said new first point and said new second point is not established when at least one of the respective said first point difference and said second point difference does not exceed a predetermined tolerance amount.

29. The method of claim 22 wherein further comprising repeating said process for the other of said inside blades and said outside blades.

30. The method of claim 29 further including controlling relative height of said inside blades and said outside blades.

31. The method of claim 22 further comprising rotating said cutter an amount to provide sufficient stock material for said repositioning of the sharpening plane to form said new cutting edge.

32. A process for radial truing and angling cutting blades of a form-relieved face mill cutter having at least one of inside blades and outside blades, said process comprising:
providing a tool rotatable about a tool axis,
releasably securing said cutter to a work spindle for rotation about a work axis,
providing relative movement between said tool and said cutter linearly along three mutually perpendicular axes and angularly about a pivot axis,
selecting said inside cutting blades or said outside cutting blades,
rotating said tool,
relatively moving said rotating tool and said cutter to remove a calculated amount of stock material from a front face of at least one of said cutting blades,
probing the cutting edge of each of the selected blades at a first point near said top of said front face and storing the location of said first point of said each blade,
determining one blade having the lowest first point location from all said selected blades,
calculating a first point difference between said lowest first point location of said one blade and the location of the first point of each remaining selected blade and storing each said first point difference for said each remaining selected blade,
establishing a new first point location for said each remaining selected blade whereby for said each remaining selected blade, the location of each said new first point is substantially the same as said lowest first point location of said one blade,
probing the cutting edge of said each selected blade at a second point near said base of said front face and storing the location of said second point of said each like blade,
comparing the location of said second point of said one blade with the location of the second point of each of the remaining like blades,
calculating a second point difference between said second point location of said one blade and the location of said second point for said each remaining like blade,
establishing a new second point location for said each remaining like blade,
calculating a new cutting edge for said each remaining like blade based upon said new first point and said new second point for said each remaining like blade,
removing stock material from said each remaining like blade by relative linear and angular movement of said tool and said cutter to form a new cutting edge thereon whereby said new first and second points for said each remaining like blade lie on said new cutting edge.

33. The method of claim 32 wherein for said each remaining like blade, at least one of said new first point and said new second point is not established when at least one of the respective said first point difference and said second point difference does not exceed a predetermined tolerance amount.

34. The method of claim 32 wherein said removing stock material comprises reorienting the sharpening plane to effect a pressure angle change of said each remaining like blade.

35. The method of claim 34 wherein said reorienting includes adjusting at least one of the offset angle and the angle S of said sharpening plane.

36. The method of claim 32 wherein said removing stock material comprises reorienting the sharpening plane to effect a radial shift from said cutting edge to said new cutting edge.

37. The method of claim 32 wherein said removing stock material comprises reorienting the sharpening plane to effect at least one of a pressure angle change and a radial shift of said cutting edge.

38. The method of claim 32 further comprising selecting the other of said inside blades and said outside blades and repeating said process.

39. The method of claim 38 further including controlling the relative height of said inside blades and said outside blades.

40. The method of claim 32 wherein said probing is performed by a non-contacting probe.

41. The method of claim 32 further comprising rotating said cutter an amount to provide sufficient stock material for forming said new cutting edge.

42. A process for sharpening cutting blades of a form-relieved face mill cutter having a plurality of cutting blades with each of said cutting blades having a cutting edge being in a sharpening plane, said sharpening including radial truing and angling of said each cutting edge, said process comprising:
determining an actual position of said each cutting edge,
comparing said actual position with a reference position for said each cutting edge,
identifying those blades having cutting edge actual positions varying by more than a predetermined tolerance amount from said reference position,
repositioning the sharpening plane of each of the identified blades to orient the cutting edge of said each identified blade in a position within said predetermined tolerance from said reference position.

43. The method of claim 42 wherein said repositioning the sharpening plane comprises adjusting at least one of an offset angle K and an angle S of said sharpening plane.

44. The method of claim 42 wherein said repositioning the sharpening plane effects a radial shift in the position of said cutting edge.

45. The method of claim 42 wherein said repositioning the sharpening plane comprises at least one of adjusting an offset angle K, adjusting an angle S of said sharpening plane, and, radially shifting the cutting edge.

46. The method of claim 42 further comprising rotating said cutter an amount to provide sufficient stock material for said repositioning of the sharpening plane to orient said cutting edge.

* * * * *